United States Patent
Tolan

[11] Patent Number: 6,036,860
[45] Date of Patent: *Mar. 14, 2000

[54] METHOD AND APPARATUS FOR THE SEPARATION OF HAZARDOUS WASTE FROM GROUNDWATER

[76] Inventor: Peter J. Tolan, 30 Greenfield La., Scituate, Mass. 02066

[ * ] Notice: This patent is subject to a terminal disclaimer.

[21] Appl. No.: 08/884,224

[22] Filed: Jun. 27, 1997

Related U.S. Application Data

[63] Continuation-in-part of application No. 08/399,188, Mar. 6, 1995, Pat. No. 5,795,474.
[51] Int. Cl.⁷ .............................. B01D 63/00; B01D 61/00
[52] U.S. Cl. ........................ 210/257.2; 210/261; 210/262; 210/258; 210/170; 210/242.1
[58] Field of Search ...................................... 210/649, 640, 210/257.2, 261, 262, 258, 170, 242.1, 908, 97, 102; 166/246

[56] References Cited

U.S. PATENT DOCUMENTS

| | | | |
|---|---|---|---|
| 2,930,754 | 3/1960 | Stuckey | 210/649 |
| 4,872,994 | 10/1989 | Jakob | 210/799 |
| 5,110,473 | 5/1992 | Hassett | 210/634 |
| 5,795,474 | 8/1998 | Tolan | 210/257.2 |

*Primary Examiner*—Ana Fortuna
*Attorney, Agent, or Firm*—Damon J. Borrelli

[57] ABSTRACT

Disclosed is a method and apparatus for the continuous remediation of a site contaminated with a hazardous substance. The remediation apparatus includes a material selectively permeable to the hazardous substance located at the site. Once isolated, the hazardous substance is removed to a remote vessel by utilization of an automated gas-injection system. The remediation apparatus also incorporates a valve configured to protect the system from detrimental, and potentially dangerous, overloadings of hazardous substances.

16 Claims, 5 Drawing Sheets

6,036,860

METHOD AND APPARATUS FOR THE SEPARATION OF HAZARDOUS WASTE FROM GROUNDWATER

CROSS-REFERENCE TO EARLIER FILED APPLICATION

This application is a continuation-in-part of U.S. patent application Ser. No. 08/399,188, entitled METHOD AND APPARATUS FOR THE SEPARATION OF HAZARDOUS WASTE FROM GROUNDWATER, of inventor Peter J. Tolan, filed Mar. 6, 1995, U.S. Pat. No. 5,795,474.

BACKGROUND OF THE INVENTION

1. Field of the Invention

The present invention relates to a method and apparatus for treating a site contaminated with a hazardous substance. More particularly, the invention relates to a method and apparatus for continuously, and automatically, remediating soil and groundwater in a site contaminated with a hazardous substance.

2. Description of the Prior Art

Worldwide, the storage and transportation of hazardous substances requires countless tanks and pipelines. Substances typically processed in these facilities include petroleum distillates, industrial solvents, and industrial wastes. Due to the dangers presented by storing and transporting concentrated solutions of these materials, engineers and government agencies conduct extensive research and development to insure the tanks and pipelines used will effectively and safely contain these materials. Weathering and unforeseen engineering limitations, however, often cause the facilities to fail, resulting in the release of chemicals into the environment.

The failure of storage tanks and pipelines impacts on the physical and economic vitality of the contaminated area. The release of concentrated chemical solutions typically causes extensive damage to the local ecosystem by contaminating or killing indigenous plant and animal life. More remote ecosystems may be affected if the contamination migrates from the site by entering the local groundwater flow. Further, local laws often require that contaminated areas be remediated, and certified as such, prior to sale or rental. These laws often result in land being left fallow for years or decades. In extreme cases, the inability to remediate contaminated sites renders industrial or residential areas uninhabitable, forcing owners and employees to evacuate the area.

Several methods are currently employed to remediate sites contaminated with hazardous substances. Unfortunately, available methodologies are often limited by soil conditions which, among other things, effect the rate of migration of hazardous contaminants. Also impacting on the usage of available remediation techniques is the size and configuration of the contamination plume. Finally, economic factors, particularly, labor and equipment costs, can, on occasion, render remediation procedures impossible to effectively commence, continue, or conclude.

At present, a common practice for the remediation of contaminated sites consists of locating a pumping system at or near the center of the plume. Contaminated groundwater is then pumped to the surface at a rate sufficient to create a cone of depression. The cone of depression causes floating contaminant to flow into the pumping well where the separation of contaminant from the groundwater can be accomplished using, for example, slow moving vertical flat, or round, belts made of oleophilic and hydrophilic materials. This is typically a labor intensive procedure, since the operation of the relevant equipment must be monitored on a virtually continuous basis in order to maximize product recovery. Thus, although effective for some applications, the physical size of these systems, their labor intensity, and power requirements, can render them inappropriate.

A need has arisen for an improved method and apparatus for the remediation of sites contaminated with hazardous substances.

SUMMARY OF THE INVENTION

It is an object of the present invention to provide a method and apparatus which does not suffer from the foregoing disadvantages and limitations.

It is yet a further object of the invention to provide a method and apparatus which provides for the continual and efficient treatment of a site contaminated with a hazardous substance.

It is a further object of the invention to provide a method and apparatus capable of commencing remediation within a short period of time after arrival at a site contaminated with a hazardous substance.

It is yet another object of the invention to provide a method and apparatus which is effective at ground level and at depths substantially below the ground surface.

It is yet another object of the invention to provide a method and apparatus which can be efficiently operated for extended periods of time.

It is yet a further object of the invention to provide a method and apparatus which provides for the automated treatment of a contaminated site.

It is another object of the invention to provide an apparatus and method that is economical to manufacture, easy to use, and that provides for the reliable and efficient remediation of a site contaminated with a hazardous substance.

The remediation apparatus of the invention generally includes a collection container and a monitor element. As described in detail below, in operation, the monitor element regulates the removal of materials from the collection container.

Generally, the collection container includes a first chamber and a second chamber. The collection container can also include a buoyancy adjusting element. When utilized, the buoyancy adjusting element changes the position of the collection container of the apparatus of the invention in response to the volume of hazardous substance removed from the site.

The collection container typically is a longitudinally extending housing having a first chamber in fluidic communication with a second chamber. Both the first chamber and the second chamber define a pair of longitudinally extending, tubular, interior chambers or cavities. The two chambers are in fluidic communication via a connecting means. The sides of the first chamber are formed of a membrane that is selectively permeable to the hazardous substance contaminating the site to be remediated. Typically, the membrane is hydrophobic and oleophilic. In the preferred embodiment of the invention, the membrane is selectively permeable to hydrocarbon substances. In its most preferred configuration, the selective permeability of the membrane permits only hydrocarbon-based hazardous substances to migrate from the surrounding contaminated area into the first chamber. Once isolated in the first chamber, the contaminating substance flows into the second chamber via the connecting means. The contaminating substance thus collects in the second chamber. If desired, a valve can be positioned in the connecting means. This valve both prevents the back-flow of the hazardous substance from the second chamber to the first chamber and a loss of pressure when an inert gas is injected into the second chamber by the gas injection system described in detail below.

Once the hazardous substance is collected in the second chamber, it is removed from the site for further processing. In one embodiment of the invention, removal of the hazardous substance from the second chamber is accomplished by pouring off the hazardous substance into a containment vessel. In the preferred embodiment of the invention, the hazardous substance is removed using an automated gas-injection system.

When a gas-injection removal system is incorporated in the apparatus of the invention, an inert gas is injected into the second chamber of the collection container under the control of the monitor element. Advantageously, this embodiment of the recovery system of the invention is substantially continuous and requires only minimal manual oversight. The monitor element typically includes a multi-component regulating element. The regulating element of the apparatus of the invention typically directs the amount, and force with which, the inert gas is injected into the collection container. In the preferred embodiment of the invention, the regulating element includes a sensor element in communication with a pair of pressure probes linked to a pressure sensitive sensor. The probes are positioned so as to monitor continuously, automatically, and simultaneously both ambient conditions and the pressure within the collection container. When the pressure sensed within the collection container exceeds that of ambient conditions by some pre-set amount, the regulating element directs the injection of the inert gas into the second chamber. Injection of the inert gas continues until the pressures sensed by both probes becomes equal, or ambient conditions exceed the internal pressure of the collection container by some pre-set amount. The cycle of gas injection and cessation, can occur virtually continuously until the contaminated site is remediated.

Other general and specific objects of the invention will in part be obvious and will in part appear hereinafter.

The invention accordingly comprises the method and apparatus embodying steps, features of construction, combinations of elements, and arrangements of parts adapted to effect such steps, as exemplified in the following detailed disclosure, the scope of the invention is indicated in the claims.

BRIEF DESCRIPTION OF THE DRAWINGS

For a fuller understanding of the nature and objects of the invention, reference should be made to the following detailed description and the accompanying drawings, in which.

DESCRIPTION OF PREFERRED EMBODIMENTS

The invention features a method and apparatus for the remediation of sites contaminated with hazardous substances. The invention includes a remediation apparatus generally incorporating a collection container and a monitoring element. The monitoring element typically includes a sensor-driven inert gas-injection system configured to assist with the removal of a hazardous substance isolated in the collection container. The apparatus of the invention can also include a protective valve designed to protect the apparatus from overloadings of the hazardous substance. The invention produces a safer and more economical means for the remediation of contaminated areas when compared to other currently available biological, chemical, and physical remediation techniques.

Figure 1:
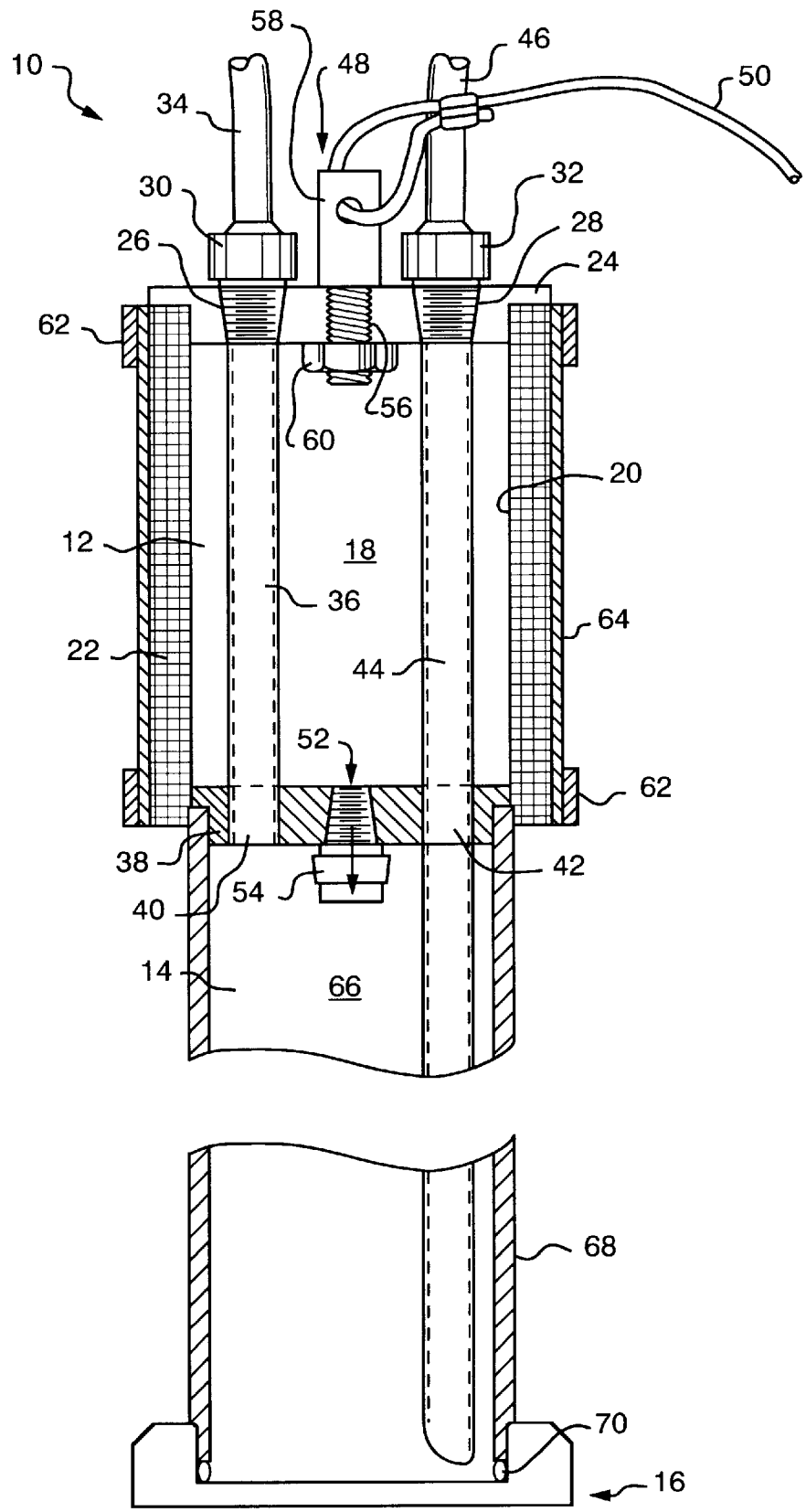
FIG. 1 is a side view, partly cut-away, of one embodiment of the remediation apparatus of the invention.
Figure 2:
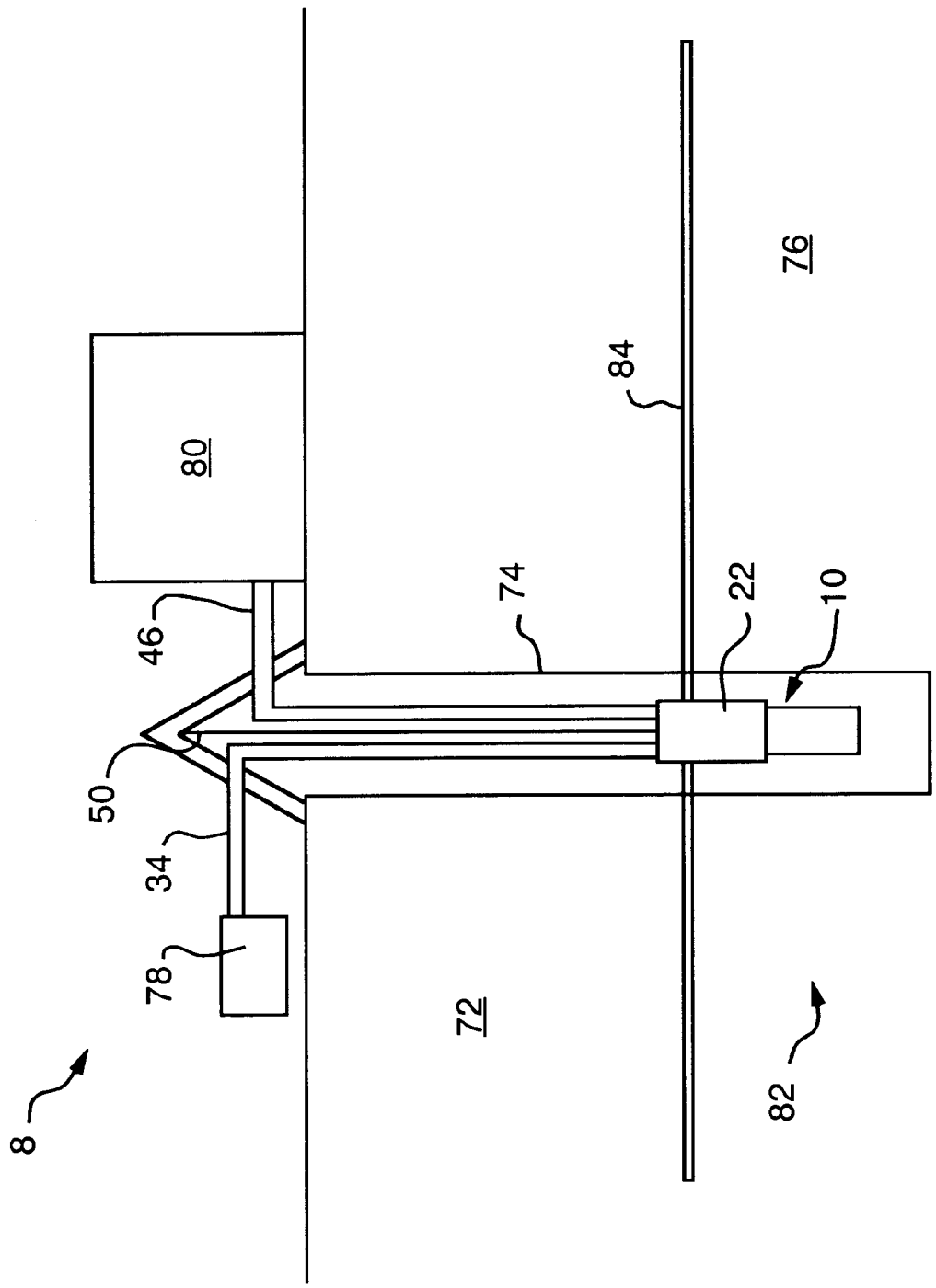
FIG. 2 is a schematic illustration of the remediation apparatus of FIG. 1 deployed at a site contaminated with a hazardous substance.
Figure 4:
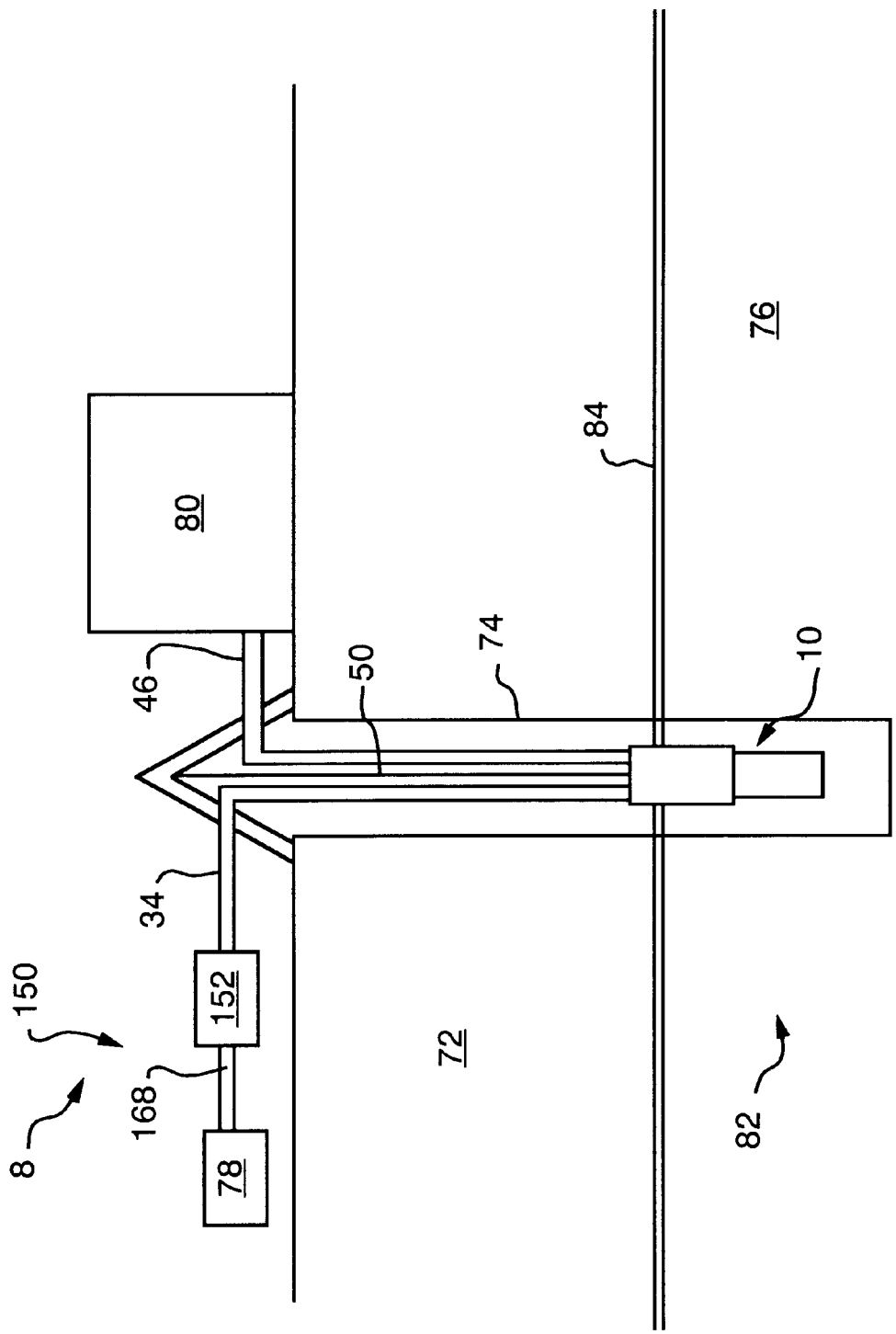
FIG. 4 is a schematic illustration of the remediation apparatus of FIG. 3 deployed at a site contaminated with a hazardous substance; and, FIG. 5 is a schematic illustration of the remediation apparatus of FIG. 4, incorporating a protective valve positioned on the pumping system of the apparatus of the invention, deployed at a site contaminated with a hazardous substance.
Figure 5:
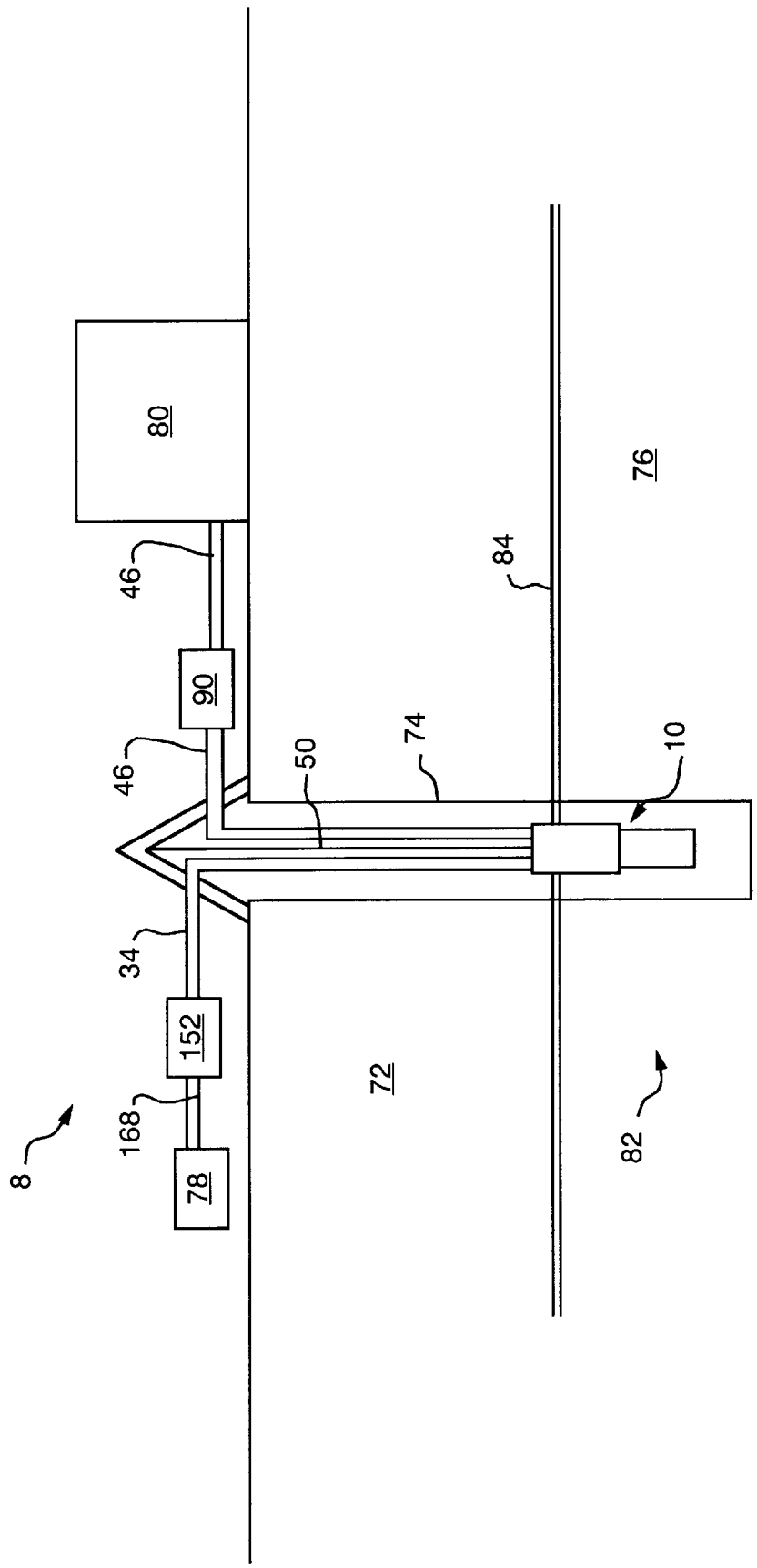

Referring to FIGS. 1 and 2 wherein like reference numerals refer to like parts, there is illustrated a first embodiment of the remediation apparatus 8 of the invention. In this embodiment of the invention, the remediation apparatus 8 includes a collection container 10 having a first chamber 12 and a second chamber 14. Typically, the collection container 10 also includes a buoyancy adjusting means 16. As shown in FIGS. 2, 4, and 5, the collection container 10 is sized and shaped to be positionable within the confines of a well pipe. The lengths of the first chamber 12 and second chamber 14 can be selected as desired for a given application. The diameter of the collection container 10 can also be altered as desired in order to permit positioning in the well pipe utilized at a given contaminated site.

The first chamber 12 defines a first tubular interior cavity 18. The sidewalls 20 of the cavity 18 are formed of a membrane 22. In the preferred embodiment of the invention as depicted in FIGS. 1 and 2, the membrane 22 is formed of a dimensionally stable hydrophobic and oleophilic substrate. To further refine its permeability characteristics, the membrane 22 preferably has an average pore size of 10 microns. In this configuration, the membrane 22 is selectively permeable to hydrocarbon substances. More particularly, the selective permeability of the membrane 22 permits only certain hydrocarbon substances, for example, gasoline, diesel fuel, jet fuel, and number two (2) heating oil, to migrate from the surrounding contaminated area into the first cavity 18. As those skilled-in-the-art will appreciate, these characteristics, i.e., hydrophobicity, oleophilicity, and pore size, can be manipulated as desired in order to selectively isolate a variety of hydrocarbon substances from groundwater. The hydrophobic characteristic of the membrane 22 keeps groundwater from flowing into the first cavity 18. A particularly useful membrane 22 having the preferred characteristics is manufactured by Porex Technologies, Fairburn, Ga., and has a "Fine" classification. If desired, a protective sheath 64 can be positioned on the membrane 22.

A top plate 24 is attached to a top portion of the membrane 22. A bottom plate 38 forms the base of the first cavity 18. Both the top plate 24, and bottom plate 38, seal their respective ends of the first chamber 12. The plates 24 and 38 can be attached to the membrane 22 by virtually any technique familiar to those skilled-in-the-art providing that a seal is created between the components. External clamps 62 can assist to form the desired seals. Centrally located on the top plate 24 is an attachment 48 for connecting a cord 50 to the apparatus 10. As shown best in FIG. 1, the attachment 48 can be an eyebolt 58 and nut 60 assembly appropriately positioned in an aperture 56 in the top plate 24. Bottom plate 38 typically includes a central aperture 52 having a check valve 54 positioned therein. The check valve 54 acts as a connecting element between the first and second chambers 12 and 14. The top plate 24 and bottom plate 38 can be formed of virtually any durable material including, for example, stainless steel.

Preferably, the top plate 24 includes two apertures 26 and 28. Located in bottom plate 38 at positions complementary to the apertures 26 and 28 are apertures 40 and 42. The apertures 26 and 28 are sized and shaped to receive a pair of connectors 30 and 32. Apertures 40 and 42 are configured to receive tubing 36 and 44 discussed in detail immediately below. More particularly, with regard to connector 30, a hose 34 is affixed to one end with the tube 36 connected to the other. The tube 36 extends from the connector 30 through the aperture 40 in bottom plate 38. The aperture 40 is sized to interferringly engage the tube 36. A hose 46 extends externally away from the connector 32. Internally, tube 44 extends from the connector 32, through the aperture 42, and into the second chamber 14. The tube 44 also interferringly engages the walls of the aperture 42.

The second chamber 14 defines a second tubular interior cavity 66 having sidewalls 68. The sidewalls 68 of the cavity 66 are formed using a non-permeable metallic substrate, for example, stainless steel. The bottom plate 38 encloses one end of the cavity 66. Like the membrane 22, the sidewalls 68 can be attached to the bottom plate 38 by virtually technique familiar to those skilled-in-the-art providing that a seal is created between the components. External clamp 62 can be employed to secure the seal. The opposing end of the cavity 66 is formed by buoyancy adjusting means 16. A gasket 70 is positioned between sidewalls 68 and buoyancy adjusting means 16 to insure the desired seal. In operation, the buoyancy adjusting means 16 maintains the collection container 10 in an upright position. In addition, the buoyancy adjusting means 16 serves to adjust the position of the collection container 10, via-a-vis the groundwater level, as the hazardous substance is removed from the site.

In operation, the apparatus 8 of this first embodiment of the invention acts to quickly and effectively remediate a site contaminated with a hazardous substance. In particular, membrane 22 functions to selectively remove the hazardous substance from the contaminated site without disturbing the groundwater. Flow across the membrane 22 is maintained as a function of the concentration gradient of the hazardous substance outside of the collection container 10 as compared to that within the collection container 10. Once positioned at the site, the collection container 10 permits continuous, safe, and efficient remediation of the contaminate site.

Referring to FIG. 2, upon arrival at a contaminated site 72 a recovery well 74 is drilled into the ground. Preferably, the well 74 is centrally positioned in the contamination plum 76. Well 74 is drilled into the ground until it extends below the level of groundwater 82 present at the contaminated site 72.

In the next phase, the collection container 10 is prepared for insertion into the well 74. In particular, a gas-injection pump 78 is connected to one end of the hose 34. The gas injected by the pump 78 preferably is an inert gas that will not react with hazardous substance 84 being removed from the contaminated site 72. The other end of the hose 34 is connected to connector 30 in aperture 26 of the collection container 10. A treatment vessel 80 is then connected to the hose 46 which is, in turn, connected to the connector 32 in aperture 28 of the collection container 10. Using the cord 50, the collection container 10 is then lowered into the well 74 until the membrane 22 rests at the interface between the groundwater 82 and contaminating hazardous substance 84.

Once positioned at the interface of the groundwater 82 and contaminating hazardous substance 84, a flow of hazardous substance 84 into first cavity 18 is virtually immediately established. As noted above, the flow is a function of the concentration gradient across the membrane 22. In particular, the hazardous substance 84 flows across the membrane 22 from the outside, wherein it is at a relatively high concentration, into the first cavity 18 where it is at an essentially zero concentration. Advantageously, since the flow occurs at a rate established by the concentration gradient it does not disturb the groundwater 82. This smooth operation of the collection container 10 insures that the hazardous substance 84 is not further mixed into the groundwater 82 and, thus, contaminated site 72.

Isolated in the first cavity 18, the hazardous substance 84 then flows through the check valve 54 into the second cavity 66. As additional substance 84 collects in cavity 66, the collection container 10 gradually sinks deeper into the groundwater 82 in the well 74. Buoyancy adjusting means 16 serves to maintain the collection container 10 upright as this action occurs. The gradual sinking of the collection container 10 insures that a clean, new cross-section of membrane 22 is continuously exposed to the hazardous substance 84. Exposure of a clean membrane 22 is desired in order to insure efficient isolation of the hazardous substance 84.

When a sufficient amount of hazardous substance 84 has accumulated in the second cavity 66, or at predetermined time intervals, the gas-injection pump 78 is activated. Pressurized gas from the pump 78 enters the second chamber via hoses 34 and 36 causing the check valve 54 to close. Typically, the reaction time of the check valve 54 is such that some portion of pressurized gas enters into the first chamber 18 and escapes through the membrane 22. This escape of gas advantageously cleanses the membrane 22, preparing it for further isolation of hazardous substance 84. Once the check valve 54 is closed, pressure in the second chamber increases until the isolated hazardous substance 84, i.e., product, begins to flow through hoses 44 and 46 into the vessel 80. Pumping in this manner continues until the level of the hazardous substance 84 in the second cavity 66 falls below the end of the tube 44. Once in the vessel 80, the hazardous substance 84 can be transported from the contaminated site 72 and treated as necessary to render it inert.

The above-described cycle of isolation and removal continues until the contaminated site 72 is remediated. The self-cleaning action of the gas-injection system described above permits continuous, uninterrupted action of the collection container 10. Should the gas-injection system fail, or for any reason be inappropriate for a given application, the second chamber 14 can be mechanically emptied. More particularly, at selected intervals the collection container 10 can be removed from the well 74, the buoyancy means 16 removed from the base of the collection container 10, and the hazardous substance 84 poured out.

Figure 3:
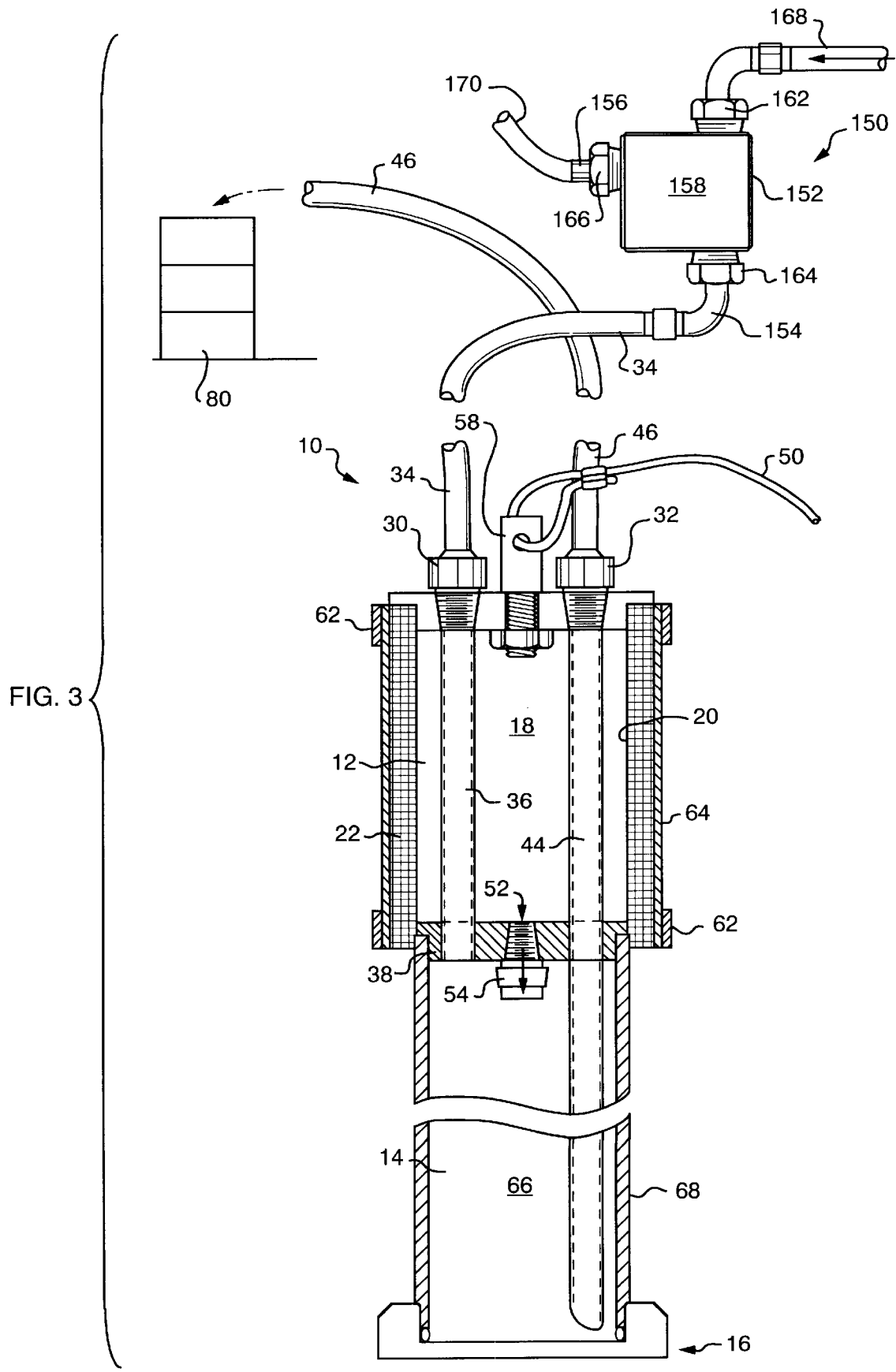
FIG. 3 is a side view, partly cut-away, of a second embodiment of the remediation apparatus of the invention incorporating a gas-injection system.

Referring now to FIGS. 3 and 4 wherein like reference numerals refer to like parts, there is illustrated a second embodiment of the remediation apparatus 8 of the invention. In this embodiment of the invention, the remediation apparatus 8 includes the collection container 10 described in detail above connected to a monitoring element 150.

Typically the monitoring element 150 includes a sensor element 152 that directs the operation of a gas-injection system 78. More particularly, the sensor element 152 directs the commencement and cessation of the injection of an inert gas into the second cavity 66 of the collection container 10. Advantageously, the embodiment of the remediation apparatus 8 shown in FIGS. 3 and 4 operates on a substantially continuous basis and requires only minimal manual oversight.

The sensor element 152 typically directs the amount, and force with which, the inert gas is injected into the collection container 10. The sensor element 152 preferably is configured so as to be able to sense differential pressures and, in response thereto, modulate the injection of an inert gas into the collection container 10.

The sensor element 152 typically includes a pair of pressure probes 154 and 156. The probes 154 and 156 are in communication with a pressure-sensitive sensor 158. Depending on the construction of the pressure sensitive sensor element 158, the probes 154 and 156 can be configured so as to be in fluidic or electronic communication with the pressure sensitive sensor. The probes are positioned so as to monitor continuously, automatically, and simultaneously both ambient conditions and the pressure within the second cavity 66 of the collection container 10. More particularly, the first probe 154 is positioned so as to sense the pressure within the second cavity 66. The second probe 156 is positioned so as to sense that the pressure existing in the ambient atmosphere of the contaminated site where the remediation apparatus 8 is utilized.

In the preferred embodiment of the invention as shown schematically in FIG. 3, the sensor element 152 consists of an air piloted air valve. The air valve 152 includes an inlet port 162, outlet port 164, and a pilot port 166. The inlet port 162 is connected to a hose 168 which is connected to a source for an inert gas (not shown). The outlet port 164 is connected to the hose 34, which, in turn, is connected to the second cavity 66 via hose 36. Intermediate along the length of hose 34 is the first probe 154. Accordingly, the hose 34 serves as a communication conduit between the second cavity 66 and the probe 154. Pressure changes in the second cavity 66 are transmitted to the first probe 154 of the air valve 152 via this interconnection. With regard to the pilot port 166, one end of the pilot port 166 is connected to a hose 170 which is exposed to ambient climatic conditions. Intermediate along the length of the hose 170 is the second probe 156. Accordingly, changes in the ambient climatic conditions are communicated to the second probe 156 of the air valve 152 via these interconnections. As a result of all of the above-stated interconnections, the probes 154 and 156 are able to monitor ambient pressure conditions and those within the second cavity 66 of the collection container 10. This information is then compared by the air piloted air valve 152 which, in turn, uses it to direct the injection of an inert gas in the manner described below.

In operation, when the pressure sensed within the collection container 10 by probe 154 exceeds that of ambient conditions as sensed by probe 156 by some pre-set amount, the sensor element 158 directs the injection of the inert gas into the second cavity 66. In the case of the preferred embodiment of the invention, the air pilot valve 152 opens permitting the inert gas to be forced into the second cavity 66. Injection of the inert gas continues until the pressures sensed by the probes 154 and 156 becomes equal, or ambient conditions exceed the internal pressure of the collection container 10 by some pre-set amount. The cycle of gas injection and cessation, can occur virtually continuously until the contaminated site is remediated.

The remediation apparatus 8 acts to quickly and effectively remediate a site contaminated with a hazardous substance. In particular, membrane 22 functions to selectively remove the hazardous substance from the contaminated site without disturbing the groundwater. As noted above, the flow across the membrane 22 is maintained as a function of the concentration gradient of the hazardous substance outside of the collection container 10 as compared to that within the collection container 10. Once positioned at the site, the remediation apparatus 8 permits continuous, safe, and efficient remediation of the contaminate site.

Referring to FIG. 4, upon arrival at a contaminated site 72 a recovery well 74 is drilled into the ground. Preferably, the well 74 is centrally positioned in the contamination plum 76. Well 74 is drilled into the ground until it extends below the level of groundwater 82 present at the contaminated site 72.

In the next phase, in the preferred embodiment of the invention, the collection container 10 is prepared for insertion into the well 74. In particular, the inlet port 162 of valve 152 is connected to a gas-injection pump 78 via hose 168. The outlet port 164 of the valve 152 is then connected to second cavity 66 via hose 34. The gas injected by the pump 78 preferably is an inert gas that will not react with hazardous substance 84 being removed from the contaminated site 72. A treatment vessel 80 is then connected to the hose 46 which is, in turn, connected to the connector 32 in aperture 28 of the apparatus 10. Using the cord 50, the collection container 10 is then lowered into the well 74 until the membrane 22 rests at the interface between the groundwater 82 and contaminating hazardous substance 84.

Once positioned at the interface of the groundwater 82 and contaminating hazardous substance 84, a flow of hazardous substance 84 into first cavity 18 is virtually immediately established. As noted above, the flow is a function of the concentration gradient across the membrane 22. In particular, the hazardous substance 84 flows across the membrane 22 from the outside, wherein it is at a relatively high concentration, into the first cavity 18 where it is at an essentially zero concentration. Advantageously, since the flow occurs at a rate established by the concentration gradient it does not disturb the groundwater 82. This smooth operation of the collection container 10 insures that the hazardous substance 84 is not further mixed into the groundwater 82 and, thus, contaminated site 72.

Isolated in the first cavity 18, the hazardous substance 84 then flows through the check valve 54 into the second cavity 66. As additional substance 84 collects in cavity 66, the apparatus 10 gradually sinks deeper into the groundwater 82 in the well 74. Buoyancy adjusting means 16 serves to maintain the apparatus 10 upright as this action occurs. The gradual sinking of the apparatus 10 insures that a clean, new cross-section of membrane 22 is continuously exposed to the hazardous substance 84. Exposure of a clean membrane 22 is desired in order to insure efficient isolation of the hazardous substance 84.

When a sufficient amount of hazardous substance 84 has accumulated in the second cavity 66, so as to create the desired pressure differential as sensed by probes 154 and 156 the gas-injection pump 78 is activated by valve 152. Pressurized gas from the pump 78 enters the second cavity via hoses 34 and 36 causing the check valve 54 to close. Typically, the reaction time of the check valve 54 is such that some portion of pressurized gas enters into the first cavity 18 and escapes through the membrane 22. This escape of gas advantageously cleanses the membrane 22, preparing it for further isolation of hazardous substance 84. Once the check valve 54 is closed, pressure in the second cavity increases until the isolated hazardous substance 84, i.e., product, begins to flow though hoses 44 and 46 into the vessel 80. Pumping in this manner continues until the pressure sensed by probes 154 and 156 falls below a pre-set differential as determined by the valve 152. Once in the vessel 80, the hazardous substance 84 can be transported from the contaminated site 72 and treated as necessary to render it inert.

The above-described cycle of isolation and removal continues until the contaminated site 72 is remediated. The self-cleaning action of the gas-injection system described above permits continuous, uninterrupted action of the collection container 10. Should the air valve-actuated, gas-injection system fail, or for any reason be inappropriate for a given application, the second chamber 14 can be mechanically emptied. More particularly, at selected intervals the collection container 10 can be removed from the well 74, the buoyancy means 16 removed from the base of the apparatus 10, and the hazardous substance 84 poured out.

As shown in FIG. 5, the remediation apparatus of the invention can also include a valve 90. Valve 90 is configured to protect the remediation apparatus 8 from overloadings of a hazardous substance 84. The valve 90 is typically positioned intermediate hose 46. The hose 46 conducts the hazardous substance 84 from the contaminated site 72. The hose 46 generally includes appropriate piping and appropriate pumping subsystems.

A detailed description of the operational and structural features of the valve 90 can be found in U.S. patent aplication Ser. No. 08/399,188 entitled, METHOD AND APPARATUS FOR THE SEPARATION OF HAZARDOUS WASTE FROM GROUNDWATER, of inventor Peter J. Tolan, which is included herein by reference.

It will thus be seen that the invention efficiently attains the objects set forth above, among those made apparent from the preceding description.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by letters patent is:

1. An apparatus for the remediation of a site contaminated with a hazardous substance, said apparatus comprising:
    a collection container having a first axially extending chamber defining a first interior cavity in fluid communication with a second axially extending chamber defining a second interior cavity, an axially extending side wall means forming said first axially extending chamber, said side walls of said first axially extending chamber being formed from a means for isolating a hazardous substance, said means for isolating said hazardous substance being a selectively permeable membrane having an inner surface and an outer surface, said inner surface defining said first interior cavity of said first chamber, said outer surface configured to be in contact with said hazardous substance, said membrane permitting said hazardous substance to migrate into said first interior cavity, said second chamber being configured to be integral with said first chamber and being configured to contain said hazardous substance following isolation by said isolating means of said first chamber; and,
    a monitoring means, said monitoring means including a means for regulating the removal of said hazardous substance from said second chamber.

2. The apparatus of claim 1 wherein said isolating means of said first chamber comprises a material that is selectively permeable to a hydrocarbon substance.

3. The apparatus of claim 1 wherein said means for regulating the removal of said hazardous substance from said second chamber further comprises a gas injection system, said gas injection system being in communication with said second chamber, said gas injection system being configured to inject an inert gas into said second chamber.

4. The apparatus of claim 3 wherein said gas infection system includes a sensor means, said sensor means directing the injection of said inert gas into said second chamber.

5. The apparatus of claim 4 wherein said sensor means is a pressure sensitive sensor comprising a first pressure probe and a second pressure probe, said first pressure probe being configured to sense the pressure in said second chamber, said second pressure probe being configured to sense the pressure of ambient air.

6. The apparatus of claim 5 wherein said pressure sensitive sensor comprises a means for comparing said pressures sensed by said first and a second pressure probes.

7. The apparatus of claim 6 wherein said pressure sensitive sensor is configured to activate said gas injection system when the pressure detected by said first probe is greater than the pressure sensed by said second probe.

8. The apparatus of claim 7 wherein said pressure sensitive sensor is configured to deactivate said gas injection system when the pressure detected by said first probe becomes equal to or less than the pressure sensed by said second probe.

9. An apparatus for the remediation of a site contaminated with a hazardous substance, said apparatus comprising:
    a first axially extending tubular chamber defining a first axially extending tubular cavity, said first axially extending tubular chamber having an axially extending wall means formed of a membrane which is selectively permeable to a hazardous substance, said membrane having an inner surface and an outer surface, said inner surface of said membrane defining said first axially extending tubular cavity, said outer surface of said membrane being in communication with said site contaminated with said hazardous substance, said membrane permitting said hazardous substance to migrate into said first axially extending tubular cavity; and
    a second axially extending tubular chamber defining a second axially extending tubular cavity, said second interior cavity integral with said first interior cavity, a connecting means joining said second interior cavity to said first interior cavity, said connecting means being configured to permit said hazardous substance to flow into the second interior cavity after migration through said membrane of said first chamber, said second chamber configured so as to be able to contain said hazardous substance; and,
    a monitoring means, said monitor means including a means for regulating the removal of said hazardous substance from said second chamber.

10. The apparatus of claim 9 wherein said membrane of said first tubular chamber comprises a material that is selectively permeable to a hydrocarbon substance.

11. The apparatus of claim 9 wherein said means for regulating the removal of said hazardous substance from said second tubular chamber further comprises a gas injection system, said gas injection system being in communication with said second tubular chamber, said gas injection system being configured to inject an inert gas into said second tubular chamber.

12. The apparatus of claim 11 wherein said gas injection system includes a sensor means, said sensor means directing the injection of said inert gas into said second tubular chamber.

13. The apparatus of claim 12 wherein said sensor means is a pressure sensitive sensor comprising a first pressure probe and a second pressure probe, said first pressure probe being configured to sense the pressure in said second tubular chamber, said second pressure probe being configured to sense the pressure of ambient air.

14. The apparatus of claim 13 wherein said pressure sensitive sensor comprises a means for comparing said pressures sensed by said first and a second pressure probes.

15. The apparatus of claim 14 wherein said pressure sensitive sensor is configured to activate said gas injection system when the pressure detected by said first probe is greater than the pressure sensed by said second probe.

16. The apparatus of claim 15 wherein said pressure sensitive sensor is configured to deactivate said gas injection system when the pressure detected by said first probe becomes equal to or less than the pressure sensed by said second probe.

* * * * *